United States Patent
Minemoto et al.

(10) Patent No.: US 6,215,576 B1
(45) Date of Patent: Apr. 10, 2001

(54) METHOD FOR MAKING A SECOND-ORDER NONLINEAR OPTICAL MATERIAL, THE MATERIAL OBTAINED BY THE METHOD, AND AN OPTICAL MODULATION DEVICE COMPRISING THE MATERIAL

(75) Inventors: Hisashi Minemoto, Ootsu; Nobuki Itoh, Osaka; Daisuke Ishiko, Osaka; Satoshi Ishizuka, Osaka, all of (JP)

(73) Assignee: Matsuhshita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/047,956

(22) Filed: Mar. 26, 1998

(30) Foreign Application Priority Data

Mar. 27, 1997 (JP) .................................................... 9-075408
Mar. 20, 1998 (JP) .................................................... 10-072542

(51) Int. Cl.[7] .............................. G02F 1/01; G02F 1/04; G02F 1/00
(52) U.S. Cl. ........................... 359/245; 359/240; 359/241; 359/321
(58) Field of Search ..................................... 359/240, 241, 359/245, 321; 264/1.36, 1.38; 385/2, 3

(56) References Cited

U.S. PATENT DOCUMENTS 5,617,499 * 4/1997 Brueck et al. ........................ 385/122
5,966,233 * 10/1999 Fujiwara et al. ..................... 359/240

FOREIGN PATENT DOCUMENTS 3-44562 * 2/1991 (JP) .
9-230293 * 9/1997 (JP) .

OTHER PUBLICATIONS

"Optical Fiber Sensors" edited by Takayoshi Okoshi (1986); pp. 148–153, w/Spot English translation.*
"Electro–Optical Effect of $Bi_4Ge_3O_{12}$ Crystals for Optical Voltage Sensors", by Osamu Kamada et al., Jpn. J. Appl. Phys. vol. 32 (1993) Pt. 1, No. 9B, pp.4288–4291.*
David Statman et al.: "Charge dynamics and poling in glass waveguides"Journal of Applied Physics, US, American Institute of Physics. New York, vol. 80, No. 2, Jul. 1996, pp. 654–661, XP00031775.
T. Fujiwara, et al.: "Large Electrooptic Modulation in a Thermally–Poled Germansilicate Fiber" IEEE Photonics Technology Letters, US, IEEE Inc, New York, vol. 7, No. 10, Oct. 1, 1995, pp. 1177–1179, XP000537229.
Osamu Kamada et al.: "Electro–Optical Effect of $Bi_4Ge_3O_{12}$ Crystals for Optical Voltage Sensors" 10th Meeting of the Ferroelectric Materials and Their application (FMA–10), Kyoto, Japan, May 26–28, 1993, vol. 32, No. 98, pp. 4288–4291, XP000213202, Japanese Journal of Applied Physics, Part 1 (Regular Papers & Short Notes), Sept. 1993.
European Search Report.

* cited by examiner

*Primary Examiner*—Georgia Epps
*Assistant Examiner*—Michael A Lucas
(74) *Attorney, Agent, or Firm*—McDermott, Will & Emery

(57) ABSTRACT

A second-order nonlinear optical material comprises a glass body poled from a first direction and a second direction, which differ from each other, so that the glass body exhibits little birefringence relative to a beam being propagated in a third direction substantially vertical to said first direction and said second direction, respectively, wherein said glass body comprises a major proportion of $SiO_2$ and a minor proportion of germanium. A method for making the material, and optical modulator devices comprising the material are also described.

19 Claims, 6 Drawing Sheets

METHOD FOR MAKING A SECOND-ORDER NONLINEAR OPTICAL MATERIAL, THE MATERIAL OBTAINED BY THE METHOD, AND AN OPTICAL MODULATION DEVICE COMPRISING THE MATERIAL

BACKGROUND OF THE INVENTION

1. Field of the Invention

This invention relates to a second-order nonlinear optical material which has a second-order, nonlinear optical effect and exhibits little birefringence along the direction of transmission of a beam, and a method for making the same. The invention also relates to optical modulation devices, which comprise the nonlinear optical material as an electrooptic element and which are useful for measurement of the variation in electric field (voltage) or as an optical switch for telecommunication and also as a phase or other modulator, temperature, and the like.

2. Description of the Prior Art

Known second-order nonlinear optical materials used as an optical modulation element include, for example, optical crystals of $LiNbO_3$ (hereinafter referred to simply as LN), $Bi_{12}SiO_{20}$ (hereinafter abbreviated to BSO), $Bi_{12}GeO_{20}$ (hereinafter abbreviated to BGO), $Bi_4Ge_3O_{12}$, and the like. According to "Optical Fiber Sensors" (published by Ohm Co., Ltd. and edited by Takayosi Ohkoshi (1986), pp. 149 to 153), optical modulation devices using these nonlinear optical materials have been developed for optical communication systems and also as an optical fiber sensor for measuring high voltage.

In recent years, in order to reduce the number of optical elements used in optical fiber sensors, studies have been made on optical fiber sensors of the type wherein lenses and a mirror are omitted from the sensor, and instead, an magnetooptic element or an electrooptic element is assembled in the light path of an optical fiber. This type of sensor is described, for example, in Japanese Laid-open Patent Application Nos. 5-297086, 6-74979, and 8-219825. Quite recently, it has been found that when an optical fiber is poled, a second-order nonlinear optical effect is produced. Optical modulation devices using the poled optical fiber have now been made as described, for example, by A. C. Liu et al in Opt. Lett. Vol. 19, pp. 466–468 (1994), by T. Fujiwara et al in IEEE Photonics Lett. Vol. 7, pp. 1177 to 1179 (1995), and in Japanese Laid-open Patent Application No. 9-230293.

However, with optical modulation devices including an optical fiber sensor, in which Ln having a large spontaneous birefringence is used, for example, it is necessary that an input beam be controlled so as to make an angle of axial deviation at around 0.1 to 0.2 or below. This is because if the incident angle of the beam axially deviates, the following two problems arise, (1) The spontaneous birefringence caused by deviating an incident beam from the principal axis of a crystal becomes greater than a birefringence caused by the electrooptic effect, with the result that the degree of modulation changes greatly from a predetermined value.

(2) Because of the temperature dependence of spontaneous birefringence and nonlinear optical constant (electrooptic constant), the degree of modulation depends greatly on the temperature characteristic.

In order to solve these problems, it may occur to use crystals which are substantially free of any 'spontaneous birefringence. Known nonlinear optical materials or crystals, which do not exhibit any spontaneous birefringence, include BGO, BSO, $Bi_4Ge_3O_{12}$ and the like. However, both BGO and BSO, respectively, have rotary optical power (i.e. the effect of the plane of polarization being rotated in proportion of the length of the crystal), so that the crystal length cannot be made large, with the attendant problem that the degree of modulation of a beam cannot be optionally set and the degree of modulation cannot be sufficiently increased as described in the above-mentioned "Optical Fiber Sensors", edited by T. Ohkoshi. On the other hand, $Bi_4Ge_3O_{12}$ undesirably involves a DC drift at high temperatures, thus presenting the problem that when used as an optical modulator, this material does not ensure a stable temperature characteristic. This is particularly set out, for example, by O. Kamada (Appl. Phys. Vol. 32 (1993), pp. 4288 to 4291).

In an optical fiber sensor of the type wherein an ordinary electrooptic element is set in position in an optical fiber, no lens is used. Where LN, which has a small tolerable range with respect to the angle of axial deviation, is used as an electrooptic element, there arises the problem that the performance of the resultant device undesirably depends greatly on the temperature. Alternatively, if liquid crystals are used, problems are involved in that the response speed becomes very low, an abrupt change of voltage cannot be measured accurately, and the liquid crystal may be solidified when used at low temperatures.

Where part of an optical fiber is poled and used as an electrooptic element, a problem as experienced in the case of a sensor wherein LN crystal is used as an electrooptic element and an incident beam is deviated from an optical axis (Z axis). More particularly, if an optical fiber is poled at part thereof, not only the nonlinear optical effect (electrooptic effect), but also the anisotropy of refractive index (spontaneous birefringence) develops. When such a poled fiber is used in an optical fiber sensor, it is difficult to obtain an optical fiber sensor with intended characteristic properties. This problem does not occur in known optical modulators wherein a change in refractive index based on the electrooptic effect of one of principal dielectric axes is utilized, and in fact, has not been recognized.

In an optical modulator proposed, for example, in Japanese Laid-open Patent Application No. 9-230293, the electrooptic effect alone is taken into account, and no mention is made of any optical device utilizing spontaneous birefringence. Accordingly, the resultant modulator has poor linearity. In this instance, two holes are made in the clad portion of an optical fiber so as to insert electrodes. As a result, there is produced spontaneous birefringence which is ascribed to the anisotropy of the sectional structure of the optical fiber and which is much greater than the spontaneous birefringence produced according to a poling treatment. This optical fiber has such a function as a so-called "polarization preserving fiber", and the state of polarization of a beam inputted from portions other than principal dielectric axes (i.e. a line connecting two pairs of holes and a direction vertical to the line) becomes very unstable. If such an optical fiber is under varying temperature conditions or is applied with an external pressure thereto, the state of polarization of the beam changes considerably. When this optical fiber is used as an electrooptic element, and a beam, which has the direction of polarization different from the principal dielectric axes, is inputted to the fiber, the degree of modulation greatly changes by changing a temperature, for example, only by several degrees in centigrade. Thus, the electrooptic element has a very poor temperature characteristic and a large distortion rate.

SUMMARY OF THE INVENTION

It is accordingly an object of the invention to provide a method for making a second-order nonlinear optical material, which exhibits little or no birefringence along a direction of propagation of a beam, in a simple way.

It is another object of the invention to provide a second-order nonlinear optical material useful for making an optical modulator or an optical fiber voltage (electric field) sensor, which has a great allowed range of angle with respect to the direction of propagation of a beam.

It is a further object of the invention to provide a second-order nonlinear optical material which is useful for making an optical modulator or an optical phase modulator which has little or no dependence of an input beam on polarization.

It is a still further object of the invention to provide optical modulator devices of the types mentioned above.

It is another object of the invention to provide an optical modulator device which has no problem on DC drift which has been one of problems involved in devices using known optically isotropic crystals such as $Bi_4Ge_3O_{12}$ crystal.

The above objects can be achieved, according to one embodiment of the invention, by a second-order nonlinear optical material which comprises a glass body poled from a first direction and a second direction, which differ from each other, so that the glass body exhibits little birefringence against a beam being propagated in a third direction substantially vertical to the first direction and the second direction, respectively, wherein the glass body is made of a composition comprising $SiO_2$.

Preferably, the glass body is poled such that the first direction and the second direction are intersected substantially at right angles to each other within a range of 90°±10°. It is also preferred that the third direction is intersected substantially at right angles to the first and second direction within a range of 90°±10°, respectively.

According to another embodiment of the invention, there is also provided a method for making a second-order nonlinear optical material which comprises the steps of:

providing a glass body which is made of a glass composition comprising a $SiO_2$; and subjecting the glass body to poling treatment by applying an electric field sufficient to cause the glass body to be poled from a first direction and then from a second direction so that the glass body exhibits little birefringence against a beam being propagated in a third direction substantially vertical to the first direction and the second direction, respectively.

It is preferred that the poling along the first or second direction is repeated until a linearly polarized beam is transmitted along the third direction and a plane of polarization of the transmitted beam is set at angle of 45 degrees with respect to the first or second direction, a transmitted beam consists of a linearly polarized beam.

In accordance with the invention, there is also provided a second-order nonlinear optical material obtained by the above method.

According to a further embodiment of the invention, there is provided an optical modulator device comprising the glass body defined above, and a pair of electrodes attached to opposite sides of the body kept apart from each other whereby the modulator serves as an optical phase modulator.

According to a still further embodiment of the invention, there is provided an optical modulator device which comprises an optical modulation unit including a polarizer, an electrooptic element, and an analyzer sequentially arranged in this order so that optical axes of the polarizer, the magnetooptic element and the analyzer are aligned, wherein the electrooptic element consists of the glass body defined before.

According to another embodiment of the invention, there is provided an optical modulator device comprising a mirror system having, at least, a first halfmirror capable of dividing a beam into halves and a second halfmirror capable of combining the halves after modulation of one of the halves, and an electrooptic element assembled in the mirror system so as to modulate one of the halves, the electrooptic element being made of the glass body defined before whereby the optical modulator device serves as interferometer when a beam is passed after polarization via the first halfmirror, in which the beam is divided into halves by means of the first halfmirror, and one of the halves is passed to the electrooptic element, electrooptically modulated in the element, combined with the other half, and passed to a light-receiving element.

According to still another embodiment of the invention, there is provided optical modulator device which comprises an optical fiber, a substrate having a groove for fixing the optical fiber, and a modulation unit including a polarizer, an electrooptic element and an analyzer sequentially arranged in this order and set in at least one groove made vertically to the first-mentioned groove in a light path of the optical fiber, wherein the electrooptic element is made of the glass body defined before.

The polarizer, electrooptic element and analyzer with or without a λ/4 plate may be integrally combined or may be separately provided at intervals therebetween provided that optical axes of these elements are adjusted properly. In the former case, only one groove is sufficient to set the elements therein. In the latter case, three grooves are formed in the optical fiber to accommodate the polarizer, electrooptic element and analyzer, respectively.

Preferably, the optical fiber is shaped in a desired form. More preferably the optical fiber is shaped in the form of a U having a flat bottom where the modulation unit is set in position, and the groove pattern is in U form.

PREFERRED EMBODIMENTS OF THE INVENTION

Figure 1A:
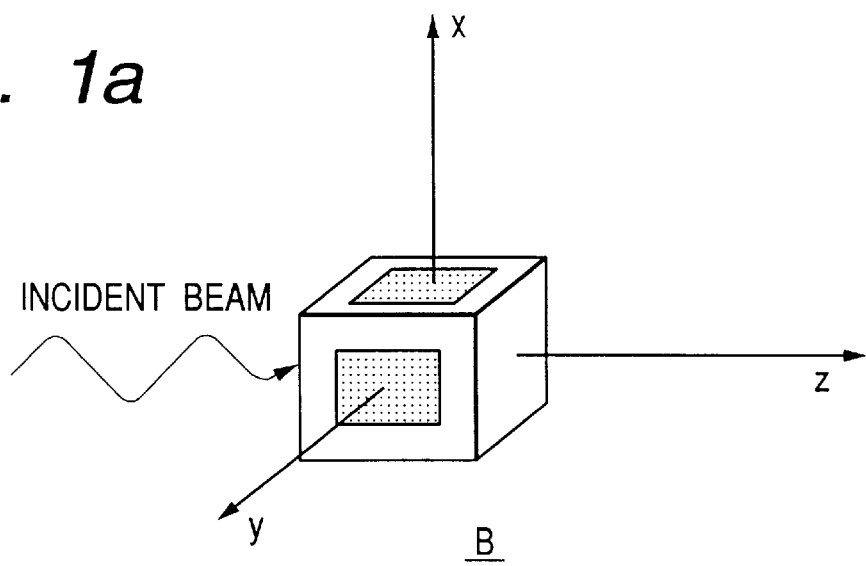
FIG. 1a is a schematic view illustrating a second-order nonlinear optical material according to one embodiment of the invention.
Figure 1B:
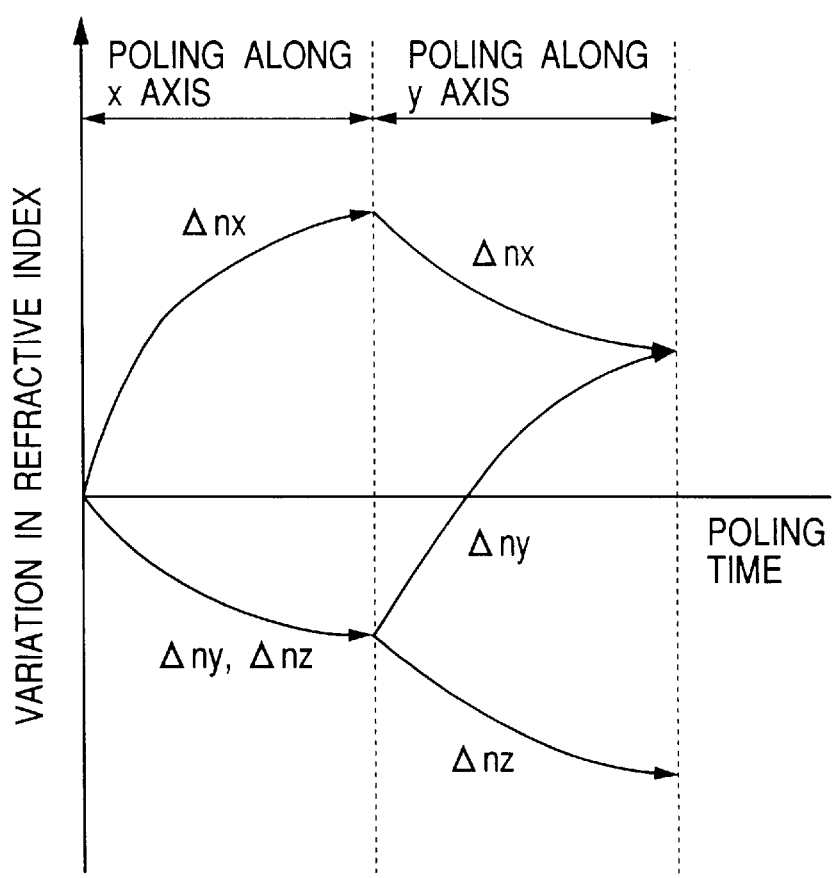
FIG. 1b is an illustrative view showing the variation in refractive index after poling treatment.

Reference is now made to the accompanying drawings, and particularly to FIGS. 1a and 1b.

Hitherto reported second-order nonlinear optical materials are those obtained by poling glass only in one direction. The glass poled to a greater extent in this way so as to obtain a greater second-order nonlinear optical characteristic or electrooptic constant exhibits a greater spontaneous birefringence. This is more particularly illustrated with reference to FIGS. 1a and 1b. In FIG. 1a, there is shown an electrooptic element B in the form of a cubic block of a nonlinear optical material, in which x, y and z axes are indicated as shown. Although the x and y axes are shown to be intersected at right angles to each other, the intersection at right angles is not always necessary. In this connection, however, where the x and y axes are intersected at angles within a range of 90±10 degrees, the poling treatment along the y axis is unlikely to be influenced by the results of initial poling treatment along the x axis, ensuring easy control of poling treatment along the y axis. The z axis is intersected substantially at right angles relative to the x and y axes, respectively.

For the poling treatment, the cubic block is heated, for example, to a temperature of 150 to 300° C., followed by application of an electric field ranging from $1 \times 10^4$ to $1 \times 10^6$ V/cm. When the poling treatment is carried out along the x axis, electron polarization along the x axis becomes great. As a result, a refractive index, nx, relative to a beam polarized in the direction of the x axis (i.e. an optical beam whose electric field oscillates along the x axis) increases. On the other hand, refractive indices, ny and nz, relative to optical beams polarized vertically to the above-mentioned beam, respectively, lower as is particularly shown in FIG. 1b. Accordingly, where the poling treatment is effected only from one direction, a beam propagating along the z axis inevitably exhibits spontaneous birefringence. Like a prior art case using LN, if the optical material poled in one direction is used, the resultant modulation device is greatly influenced by an ambient temperature and exhibits a degree of modulation different from an intended one.

When the cubic body poled along the x axis is further subjected to poling treatment by applying an electric field along the y axis to the cubic body. The resultant body exhibits a larger refractive index, ny, relative to a beam polarized in the direction of the y axis. This is particularly shown in FIG. 1b. Proper choice of the poling time and poling potential enables one to make nx ny. Hence, with respect to the beam propagating along the direction of the z axis (i.e. a beam polarized along the x axis, a beam polarized along the y axis, or a beam having a direction of polarization between the x and y axes), the thus poled body exhibits a birefringence which is very small or is nearly to zero. Further, the poling treatment along the directions of both x and y axes makes a small refractive index along the z axis.

In general, when optically isotropic glass is poled, a variation of refractive index is about 0.001 or below. On the other hand, a degree of birefringence of LN (i.e. a difference between the maximum refractive index and the minimum refractive index) is around 0.09, which is larger by about two orders of magnitude than a birefringence of the nonlinear optical material of the invention. This leads to an accuracy of angle of a beam inputted to the nonlinear optical material which is larger by about two orders of magnitude than an accuracy attained by LN. Thus, it becomes possible to keep the angle of axial deviation within a range of ±10 degrees. This permits very easy fabrication of an optical modulator.

According to one embodiment of the invention, there is provided a second-order nonlinear optical material which comprises a glass body poled from a first direction and a second direction, which differ from each other, so that the glass body exhibits little birefringence against a beam being propagated in a third direction substantially vertical to the first direction and the second direction, respectively, wherein the glass sheet comprises $SiO_2$.

As described above, the glass body should comprise $SiO_2$ and can be poled from different axes of x and y. Preferably, the glass composition comprising from 80 to 95 wt % of $SiO_2$ and correspondingly from 5 to 20 wt % of $GeO_2$.

The glass composition may further comprise additive components such as oxides and/or fluorides of Te, Bi, Pb, Sn and the like. These components may be used singly or in combination and, if present, the total amount of the additive components ranges up to 40 wt % based on the composition. If the additive component or components are added in amounts exceeding 40 wt %, the resultant glass may be too low in softening point, or may lower in mechanical strength, or may involve an undesirably great variation in the quantity of transmitted light when ambient temperatures change.

If such a preferred glass composition as mentioned above is poled, the resultant glass body exhibits better optical nonlinearity.

Usually, the body is in cubic or rectangular parallelepiped form, or in cylindrical form.

The first and second directions should preferably be intersected substantially at right angles to each other within a range of 90 degrees ±10 degrees. Likewise, the third direction should preferably be intersected with the first and second directions substantially at right angles within a range of 90 degrees ±10 degrees, respectively.

The fabrication of the nonlinear optical material according to another embodiment of the invention is described with reference to FIGS. 2a to 2e.

Initially, a glass sheet having such a composition as defined above is provided. The glass sheet is optically polished at least on upper and lower sides thereof.

Figure 2A:
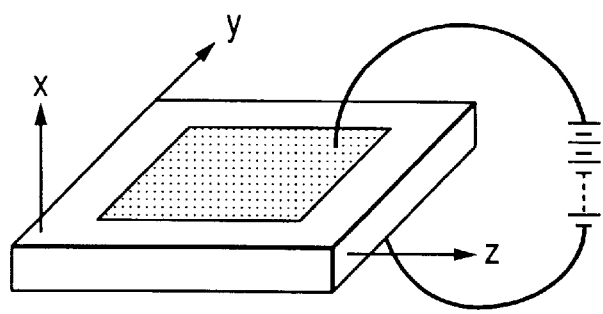
FIGS. 2a to 2e are, respectively, schematic views illustrating a method of making a second-order nonlinear optical body according to another embodiment of the invention.

The glass sheet is vacuum deposited with an aluminium electrode on the polished sides, respectively, after which the glass sheet is placed in an electric furnace whose atmosphere is substituted with dry nitrogen and kept at a temperature, for example, of 250° C. until the sheet reaches the temperature. The temperature may range from 100 to 400° C. The dry nitrogen may be replaced by an inert gas such as Ar. In this condition, the sheet is poled in a first direction, for example, of x axis shown in FIG. 2a by applying an appropriate voltage ranging from 1 kV to 10 kV, e.g. 5 kV, to the sheet for about 10 to 300 minutes, e.g. for 100 minutes. This poling treatment is shown in FIG. 2a.

Figure 2B:
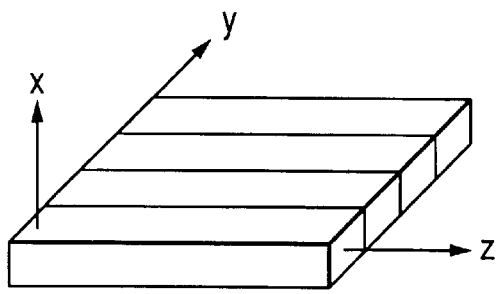

Thereafter, the electrodes deposited on the glass sheet is completely removed, for example, by chemical etching, and is cut into pieces having a width, for example, of 0.6 mm by means of a rotary blade saw as shown in FIG. 2b.

Figure 2C:
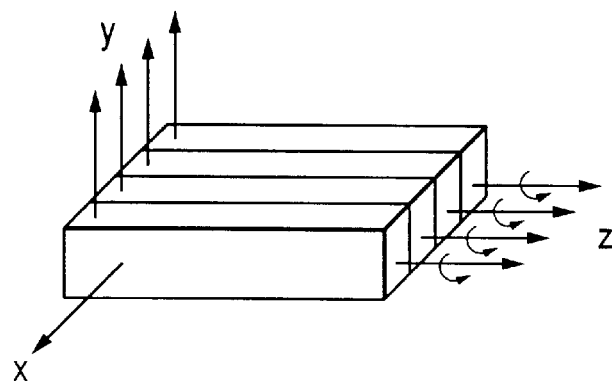

After the cutting, the pieces are subjected to further poling treatment in a second direction of y axis shown in FIG. 2c. To this end, the cut face or faces of each piece are rotated about z axis, which is substantially normal to the x and y axes, within a range of 90 degrees ±10 degrees so that the y axis of each piece turns substantially upward as shown in FIG. 2c. The pieces in this condition are bonded together by means of a bonding agent such as a ceramic-based agent or an epoxy resin bonding agent. The thus bonded sheet is optically polished on upper and lower sides thereof by 0.1 mm in total, thereby making a sheet thickness at 0.5 mm.

Figure 2D:
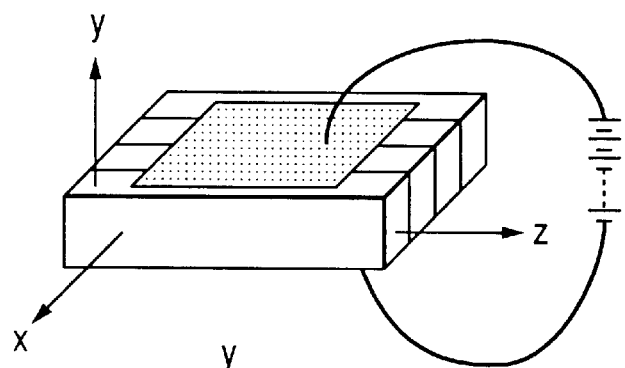
Figure 2E:
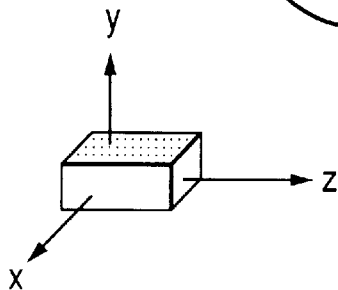

Subsequently, an aluminium electrode is vacuum deposited on the opposite sides of the bonded sheet and attached with a lead wire, followed by placing the sheet in the electric furnace in an atmosphere of dry nitrogen and applying a potential of 5 kV for 30 minutes as shown in FIG. 2d. The thus poled sheet is cooled down to room temperature.

A linearly polarized beam is transmitted to the sheet along the direction (i.e. z axis) vertical to the first and second poling directions (i.e. x axis and y axis) to measure an ellipticity of the beam. For the measurement, the polarized plane of an input beam is set at an angle of 45 degrees relative to the x axis. Where the transmitted beam consists of an elliptically polarized beam, the above-stated poling treatment is repeated until the elliptically polarized beam is turned to a substantially linearly polarized beam.

Although depending on the degree of poling treatment, when the angle between the x and y axes is in the range of 90 degrees ±10 degrees and the angle between the z axis and each of the x and y axes is in the range of 90 degrees ±10 degrees, the sheet is substantially free of any birefringence.

When the poled sheet is applied to as an electrooptic element, it is cut into pieces having a desired size by appropriate means such as a rotary blade saw. The piece is optically polished along the z axis (i.e. a direction along which a beam is transmitted) on opposite sides thereof to obtain an electrooptic element. The size of the piece depends on the purpose in end use.

In the foregoing, the poling treatment is performed by heating a glass sheet and applying to a high voltage as defined before for a given time. The poling may likewise proceed when a high electric field of $1 \times 10^4$ to $1 \times 10^6$ V/cm is applied to a glass sheet while exposing to UV light. Alternatively, there may be used other methods including a corona poling method, or a method wherein a high voltage as defined before is applied to in vacuum.

The applications of the electrooptic element obtained above to optical modulators are described.

Figure 3:
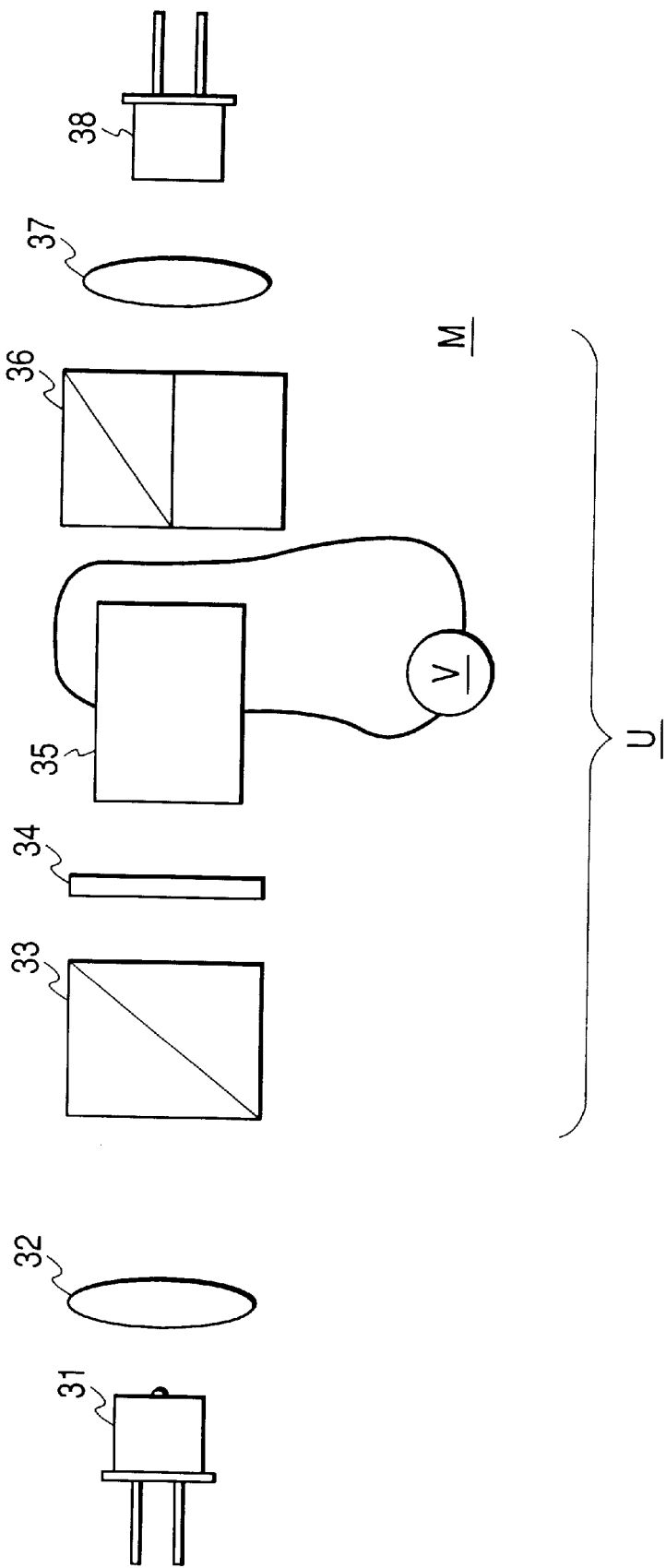
FIG. 3 is a schematic view showing an optical modulator according to a further embodiment of the invention.

FIG. 3 shows an optical modulator system M which includes a beam source 31 such as a light emitting diode, a collimator lens 32, an optical modulation unit U including a polarizer 33 made, for example, of a polarizing beam splitter, a λ/4 plate 34 made of quartz, an electrooptic element 35 and an analyzer 36, a focusing lens 37, and a light-receiving element 38 arranged in this order, as shown in FIG. 3. The optical axes of these elements including the polarizer 33, the λ/4 plate 34, the electrooptic modulator 35 and the analyzer 38 are aligned. The electrooptic element is made of a block of the glass material poled from two different directions as described above. It will be noted that this arrangement shown in FIG. 3 is known in the art except that the electrooptic element is made of the block poled from two directions.

In operation, the beam from the source 31 is transmitted through the collimator lens 32 to obtain parallel beams, followed by passing through the unit U. The beams transmitted through the analyzer 36 is focused at the focusing lens 37 and converted to electric signals in the light-receiving element 38. Thus, the beam can be converted to electric signals. When an AC voltage of 1000 V is applied to electrodes (not shown) of the electrooptic element 35, AC wave signals with a degree of modulation of 1% is obtained. In this way, an electrooptic modulator can be obtained.

Moreover, it has been experimentally found that when the nonlinear optical block or piece assembled in the optical modulator M is applied with a beam while changing an angle of incidence of ±1 degree from an incident angle vertical to the face of the electrooptic element through which the beam is transmitted, a variation in the degree of modulation (relative to a degree of modulation taken as 100 when the beam is incident in vertical direction) is within ±3% or below. Likewise, when the angle of incidence is changed within ±10 degrees, the variation has been found to be within ±10%.

The optical modulator system M comprising the electrooptic element of the invention is placed in a dry atmosphere while changing a temperature ranging from −20° C. to +80° C. so as to measure a variation in degree of modulation depending on the variation of temperature. As a result, it has been found that the variation in the degree of modulation relative to a degree of modulation at room temperature being taken as 100 is as good as within ±2%. Moreover, when the modulator system M is placed at high temperatures of 70° C. or above, any DC drift in the quantity of beam is not observed, unlike an optical modulator comprising a crystal plate of $Bi_4Ge_3O_{12}$, thereby providing stable modulation signals.

In the embodiment of FIG. 3, the λ/4 plate 34 is used as an optical modulation element. This is because an incident, linearly polarized beam is converted to a circularly polarized beam and is thus optically biased, so that analog (intense) modulation signals are taken out in good linearity. Where a beam is subjected to On-OFF modulation as in the case of digital modulation, this plate may be omitted.

Another embodiment of the invention is illustrated with reference to FIG. 4.

The electrooptic element obtained according to the procedure of FIGS. 2a to 2e illustrated hereinbefore is used as an optical modulation element or a beam phase modulation element to provide an interferometer of the Mach-Zehnder type.

Figure 4:
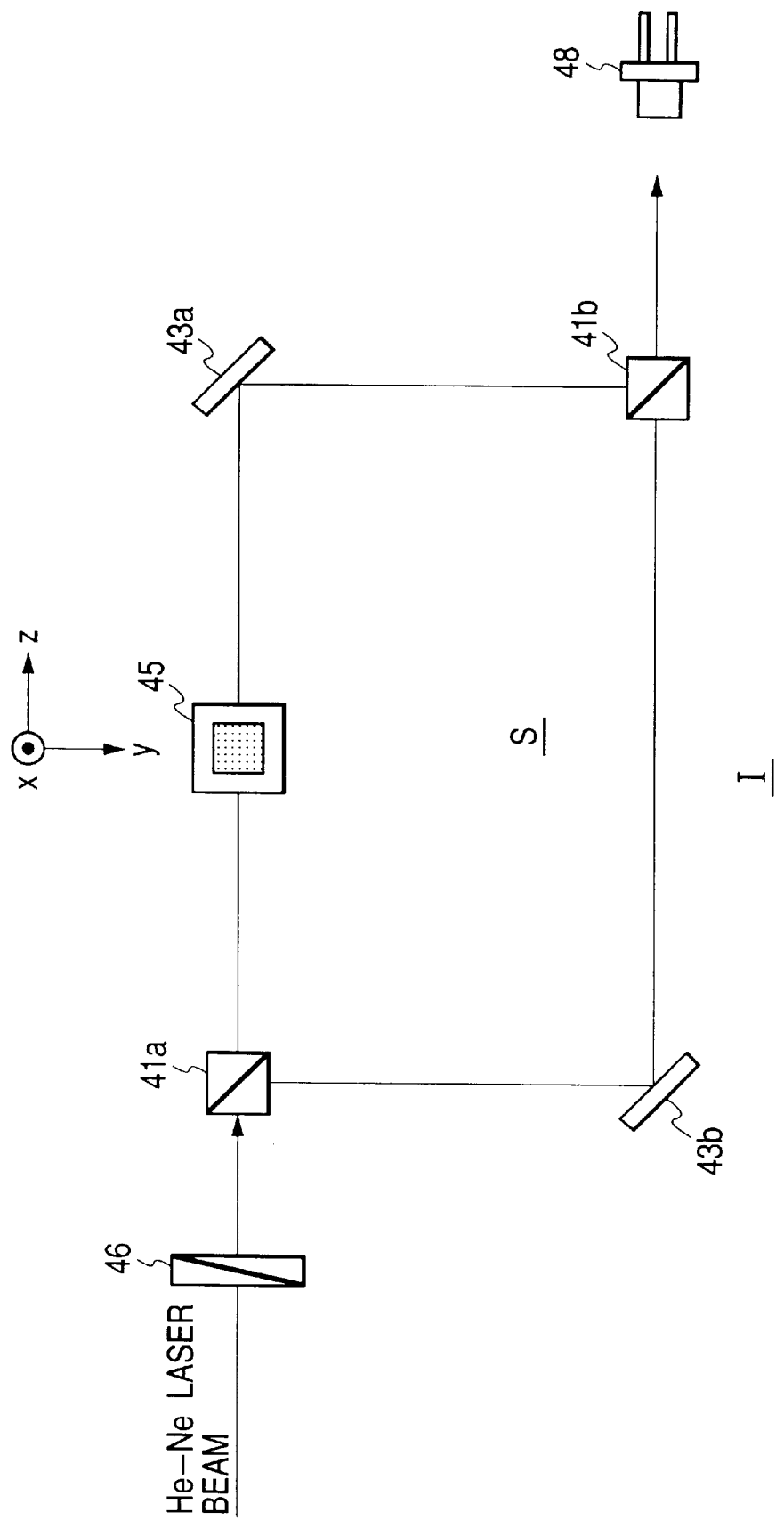
FIG. 4 is a schematic view showing an optical modulator used as an interferometer according to a still further embodiment of the invention.

In FIG. 4, there is shown an interferometer I including an analyzer 46 and a mirror system S. The mirror system S has a first half mirror 41a, a first total reflection mirror 43a, a second total reflection mirror 43b, and a second halfmirror 41b as shown in FIG. 4. An electrooptic element 45 is placed between the first halfmirror and the first total reflection mirror 43a. In this case, the element 45 serves as an optical modulator element. A light-receiving element 48 is provided to receive a beam from the second halfmirror 41b.

In operation, a He—Ne laser beam, which has good coherence, is used as an incident beam. In the figure, polarized light of the incident beam is set to transmit along a direction of x axis. The electrooptic element 45 used is one in which electrodes are formed on opposite sides of the element along the y axis.

The laser beam is polarized in the polarizer 46 and is passed to the first halfmirror 41a wherein it is divided into halves. When a voltage of 1500 V is applied to the element 45 along the x axis, the phase of the incident light divided as one half is modulated. On the other hand, the other half is passed via the halfmirror 41b and the second total reflection mirror 43b to the second halfmirror 41b without modulation of the phase. The phase modulated light and the non-modulated light are combined together in the second halfmirror 41b to obtain modulation signals in the light-receiving element 48.

Then, electrodes are attached to the electrooptic element 45 on opposite sides along the x and y axes, respectively. A voltage of 1500 V is applied to the electrodes from the directions of the x and y axes at the same time. At that time, when the direction of poling of the incident beam is rotated by use of the polarizer 46, any appreciable difference in the degree of modulation cannot be seen. Furthermore, when the polarizer 46 is removed, modulation signals can be observed in the light-receiving element 48. Thus, the electrooptic element of the invention can be used as an optical modulation element, which is substantially free of any dependence on the polarization of an incident beam. This optical modulation element needs no polarizer.

For comparison, it has been experimentally confirmed through the following experiment. A known nonlinear optical glass material poled only in one direction (or in the direction of the x axis) is provided, and electrodes are formed, along the x and y axes, on opposite sides of a block of the poled material in the same manner as described above. This element is assembled as the electrooptic element 45 of the interferometer shown in FIG. 4. When a transmitting plane of polarization of the polarizer 46 is rotated, the modulation signals observed in the light-receiving element 48 greatly changes along with the rotation of the plane of the polarization of the incident beam. This is because when the electrooptic element made of the nonlinear optical material poled only in one direction is used, the rotation of the polarized plane leads to a change in the phase of transmitted light due to the spontaneous birefringence caused by the poling. As a result, the light intensity observed in the light-receiving element 48 changes without application of any voltage. In addition, the light intensity changes since little nonlinear optical characteristic is shown along the direction of the y axis.

Figure 5:
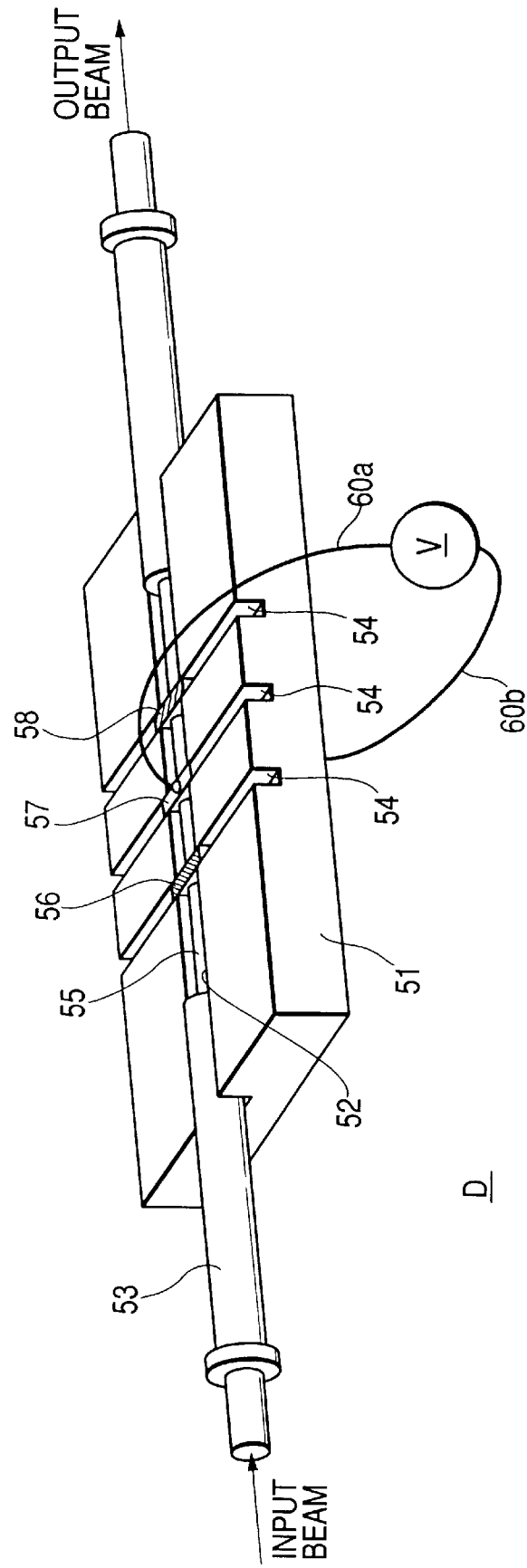
FIG. 5 is a schematic view showing an arrangement of an optical modulator according to another embodiment of the invention.

Moreover, when the plane of polarization, through which the beam is passed to the electrooptic element 45, is along the y axis, modulation signals of the light by application of the voltage can be scarcely observed. Additionally, when the polarizer 46 is removed, modulation signals with a desired level cannot be obtained. Thus, the device cannot be used as an optical modulator. Reference is now made to FIG. 5 which refers to a further embodiment of the invention comprising an electrooptic element made of the second-order nonlinear material of the invention.

An optical modulation device D of this embodiment includes a substrate 51 having a groove 52 for fixing a jacketed optical fiber 53. The substrate 51 also has three grooves 54 formed vertically with respect to the groove 52. The optical fiber 53 has a jacket-free or bare portion 55. The bare portion 55 consists of a core and a cladding layer but is free of any jacket and a buffering layer although a surface treating agent may be deposited on the cladding layer as used to permit intimate contact between the cladding layer and the buffer layer.

In the light path of the optical fiber 53, a polarizer $+\lambda/4$ plate 56, an electrooptic element 57 and an analyzer 58 are, respectively, placed in the grooves 54 as shown.

For the fabrication of the optical modulator device, the substrate 51 is provided, which is made of an insulating material such as glass, ceramics, resins or the like. A glass-epoxy resin substrate which has good insulating properties and good processability is preferably used. The substrate 51 is made with the groove 52 by use of a rotary blade saw. The jacket of the optical fiber at a portion indicated in the figure is removed to make the bare portion 55. This bare portion 55 is bonded to the groove 52.

Thereafter, the grooves 54 are also made by use of a rotary blade saw as shown.

The element 56 made of a polarizer and a $\lambda/4$ plate, the electrooptic element 57 and the analyzer 58 are, respectively, set in grooves 54 and bonded to the substrate 51. The bonding agent used in this embodiment includes, for example, a ceramic-based bonding agent.

A lead wire 60a is connected directly to an electrode (not shown) of the electrooptic element 57 by use of a silver paste. Another lead wire 60b is connected directly to the other side of the element 57 by making a hole in the substrate 51 to expose the other side. The electrooptic element 57 is made according to the method of the invention and has, for example, a thickness of 1.5 mm along the direction of transmission of a beam.

When a non-polarized beam is passed from one end of the optical fiber as an input beam and a potential of 1000 V is applied to the electrooptic element 57, AC modulation signals with a degree of modulation of 0.7% can be obtained.

When the temperature characteristic of the electrooptic element 57 is measured wherein a degree of modulation at room temperature is taken as 100%, the variation in the degree of modulation is as good as ±3.5% in a temperature range of from −20 to 80° C.

Moreover, at high temperatures of 70° C. or over, no DC drift is observed as is experienced in the case of an electrooptic element made of a $Bi_4Ge_3O_{12}$ crystal. Thus, the electrooptic element of the invention ensures a stable temperature characteristic.

It will be noted that the optical modulator device of this embodiment has the input and output directions of a beam aligned in line, and the optical fiber has no bent portion or portions. Accordingly, the modulator device is particularly useful for optical communication.

Reference is now made to FIGS. 6a to 6d which schematically show an optical modulator device according to another embodiment of the invention. A device D1 shown in FIG. 6d includes a substrate 70 having a groove pattern 71 made of grooves 71a and 71b arranged in parallel to each other and a groove 71c formed vertically to the grooves 71a and 71b, an element 72 made of polarizer $+\lambda/4$ plate, an electrooptic element 73 and an analyzer 74 set in grooves 75a, 75b and 75c, respectively, in this order, and an optical fiber 76 set in the groove pattern 71, thus forming the optical modulator device D1 in a hybrid manner as is particularly shown in FIG. 6d.

For the fabrication of the device D1, the substrate 70 is first provided. Thereafter, the grooves 71a, 71b and 71c are made by use of a rotary blade saw. The substrate 70 is made of an insulating material such as glass-epoxy resin.

The optical fiber 76 is provided, part of which is subjected to removal of its jacket to provide a bare portion 76a. The bare portion 76a of the optical fiber 76 is thermally processed or bent, by means of a hot air blower, to make a U shape having a flat bottom thereof. The manner of making the U-shape optical fiber is described, for example, in U.S. Pat. No. 5,699,461 (corresponding to Japanese Laid-open Patent Application No. 8-219825).

Figure 6D:
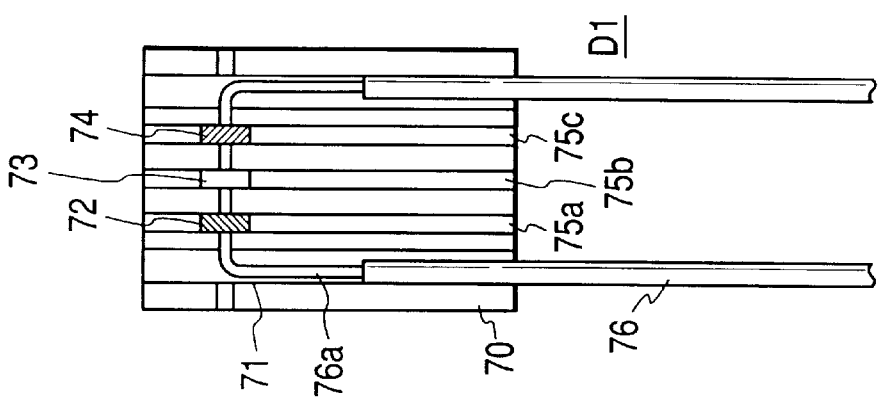
FIGS. 6a to 6d are, respectively, views illustrating a procedure of making an optical modulator according to another embodiment of the invention.
Figure 6C:
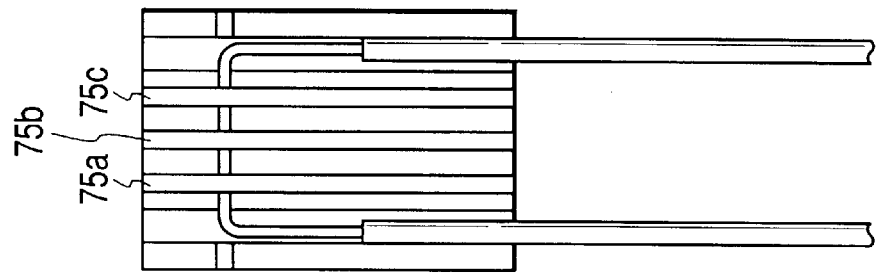
Figure 6B:
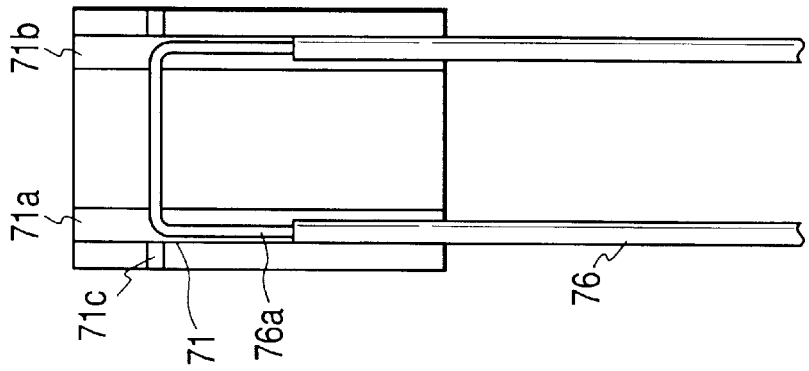
Figure 6A:
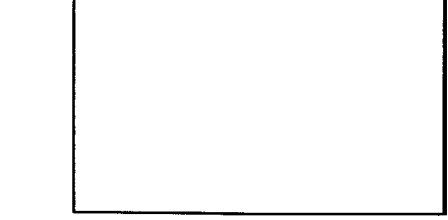

The thus shaped optical fiber 76 is set in and bonded to the groove pattern 71 as shown in FIG. 6b.

Thereafter, the grooves 75a, 75b and 75c are formed by use of a rotary blade saw. These grooves usually have a width of 0.05 to 5 mm although depending on the thickness of the optical elements.

The polarizer 72 attached with a $\lambda/4$ plate, the electrooptic element 73 and the analyzer 74 are, respectively, fixed in the grooves 75a, 75b and 75c by means of a bonding agent. The electrooptic element 73 is one which has been described hereinbefore. The polarizer, $\lambda/4$ plate and analyzer are, respectively, those known in the art.

When the element 73 has a thickness of about 1 mm along the direction of beam transmission and applied with a voltage of 1000 V, AC modulation signals with a degree of modulation of 0.4% is obtained.

In the optical modulation device of this embodiment, the input beam and output beam can be transmitted in parallel to each other, and the device can be arranged compact in size, not elongated along its length. Thus, the device is useful as an optical fiber electric or voltage sensor.

It has been found that when the temperature characteristic of the optical modulator device is measured, good results of ±3% are obtained with respect to the variation in the degree of modulation in the temperature change of −20° C. to +80° C. when a degree of modulation at room temperature is taken as 100%.

If an optical loss can be reduced as small as possible, the bent portions of the optical fiber may be vacuum deposited with a metal or coated with a metallic paste in order to effectively reflect a beam at the bent portions.

What is claimed is:

1. A second-order nonlinear optical material which comprises a glass body poled from a first direction and a second direction, which differ from each other, by the respective application of first and second electric fields thereto, so that said glass body exhibits, in the absence of the first and second electric fields, little birefringence with respect to a beam being propagated in a third direction substantially vertical to said first direction and said second direction, respectively, wherein said glass body comprises $SiO_2$.

2. A second-order nonlinear optical material according to claim 1, wherein said first direction and said second direction intersect substantially at right angles to each other within a range of 90 degrees ±10 degrees.

3. A second-order nonlinear optical material according to claim 1, wherein said third direction intersects substantially at right angles relative to said first direction and said second direction within a range of 90 degrees ±10 degrees.

4. A second-order nonlinear optical material according to claim 1, wherein said glass body is made of a composition which comprises 80 to 95 wt % of $SiO_2$ and, correspondingly, 20 to 5 wt % of $GeO_2$.

5. A second-order nonlinear optical material according to claim 4, wherein the composition further comprises at least one oxide selected from the group consisting of oxides and fluorides of Te, Bi, Pb and Sn in a total amount of up to 40 wt % of said composition.

6. An optical modulator device comprising a glass body defined in claim 1, and a pair of electrodes attached to opposite sides of said body along the first or second direction whereby said device serving as a phase modulator.

7. An optical modulator device which comprises an optical modulation unit including a polarizer, an electrooptic element, and an analyzer aligned in a light path from a light source, wherein said electrooptic element consists of said glass body defined in claim 1.

8. An optical modulator device according to claim 7, wherein a collimator lens is placed upstream of said optical modulation unit whereby parallel light rays are passed to said optical modulation unit.

9. An optical modulator device according to claim 7, further comprising a λ/4 plate between said polarizer and said electrooptic element.

10. An optical modulator device comprising a mirror system having, at least, a first halfmirror capable of exactly dividing a beam into halves and a second halfmirror capable combining the halves after modulation of one of the halves, and an electrooptic element assembled in said mirror system so as to modulate one of the halves, said electrooptic element being made of said glass body of a desired form defined in claim 1 whereby said optical modulator device serves as interferometer when a beam is passed after poling via said first mirror, in which said beam is divided into halves by means of said first mirror, and one of the halves is electrooptically modulated, and is combined with the other half and passed to a light-receiving element.

11. An optical modulator device according to claim 10, wherein said electrooptic element is applied with a modulation voltage from two different directions substantially vertical to a direction of transmission of said beam.

12. An optical modulator device which comprises an optical fiber, a substrate having a groove for fixing said optical fiber, and a polarizer, an electrooptic element and an analyzer arranged in this order and set in three grooves made vertically to the first-mentioned groove, respectively, in a light path of said optical fiber, wherein said electrooptic element is made of said glass body defined in claim 1.

13. An optical modulator device according to claim 12, wherein said substrate has a groove pattern, and said optical fiber is shaped in U form having a flat bottom and set in said groove pattern wherein the three grooves are formed at the flat bottom.

14. A method of making a second-order nonlinear optical material which comprises the steps of:

providing a glass body which is made of a glass composition comprising $SiO_2$; and subjecting said glass body to poling by applying an electric field sufficient to cause said glass body to be poled from a first direction and then from a second direction so that said glass body, in the absence of electric field application, exhibits little birefringence with respect to a beam being propagated in a third direction substantially vertical to said first direction and said second direction, respectively.

15. A second-order nonlinear optical material obtained by the method of claim 14.

16. A method according to claim 14, wherein said first direction and said second direction intersect substantially at right angles to each other within a range of 90 degrees ±10 degrees.

17. A method according to claim 14, wherein said third direction intersects substantially at right angles relative to said first direction and said second direction within a range of 90 degrees ±10 degrees.

18. A method according to claim 14, wherein said glass body is poled in the first direction or second direction by applying an electric field of $1\times10^4$ to $1\times10^6$ V/cm, to said glass body across the first direction or second direction.

19. A method according to claim 14, wherein the poling along the first or second direction is continued until when a linearly polarized beam is transmitted along the third direction and a plane of polarization of the transmitted beam is set at angle of 45 degrees with respect to the first or second direction, a transmitted beam consists of a linearly polarized beam.

* * * * *